United States Patent [19]

Scott

[11] Patent Number: 5,122,673
[45] Date of Patent: Jun. 16, 1992

[54] APPARATUS FOR CONVEYING ELECTRICAL POWER TO DUAL-TANDEM VEHICLE WHEELS

[76] Inventor: Russell E. Scott, 1768 W. 1300 North, Apt. 16, Salt Lake City, Utah 84116

[21] Appl. No.: 591,437

[22] Filed: Oct. 1, 1990

[51] Int. Cl.$^5$ ............................................. B60L 1/14
[52] U.S. Cl. .................................. 307/10.8; 362/78; 439/16; 439/34
[58] Field of Search ..................... 340/425.5, 431, 433; 307/9.1, 10.1, 10.8; 362/35, 78, 72; 439/13, 16, 34

[56] References Cited

U.S. PATENT DOCUMENTS

| | | | |
|---|---|---|---|
| 3,113,727 | 12/1963 | Bradway | 362/78 |
| 3,162,835 | 12/1964 | Dudar | 439/16 |
| 3,660,816 | 5/1972 | Barber | 439/16 |
| 3,937,542 | 2/1976 | Amundsen, Jr. | 439/16 |
| 4,381,537 | 4/1983 | Hinrichs | 362/78 |
| 4,881,153 | 11/1989 | Scott | 362/78 |

FOREIGN PATENT DOCUMENTS 8604308 7/1986 World Int. Prop. O. ............ 362/78

*Primary Examiner*—A. D. Pellinen
*Assistant Examiner*—Jeffrey A. Gaffin
*Attorney, Agent, or Firm*—William E. Hein

[57] ABSTRACT

An electrical brush contact apparatus for conveying electrical power from a vehicle power source to the wheels of vehicles having dual-tandem pairs of wheels includes a brush ring positioned at the juncture between the inner and outer rims of the front pair of dual-tandem vehicle wheels and the inner and outer rims of the rear pair of dual-tandem vehicle wheels. Each of the brush rings is electrically insulated from the rims with which it is associated by a flat insulating member or an insulating extrusion. Each pair of insulating extrusions and brush ring are coupled for rotation in concert with the wheels of the vehicle. Front and rear support members having idler pulleys thereon are suspended between the inner and outer pair of dual wheels and between the front and rear pair of tandem wheels. A belt, coupled between each one of the brush rings and an adjacent one of the idler pulleys, is driven by the brush ring. A central turnbuckle is employed to adjustably couple the front and rear support members, thereby providing adjustment for the tension of the belts driven by the brush rings. Electrical power from the vehicle is connected to the front and rear support members and thence to the brush rings by way of brushes that are connected to the front and rear support members and that are also in electrical contact with the brush rings. The electrical power conveyed to the rotating brush rings may then be connected to lighting systems, sensors, etc.

4 Claims, 4 Drawing Sheets

APPARATUS FOR CONVEYING ELECTRICAL POWER TO DUAL-TANDEM VEHICLE WHEELS

BACKGROUND AND SUMMARY OF THE INVENTION

This invention relates generally to motor vehicles and more specifically to a self-suspended electrical brush contact system for conveying electrical power to the wheels of vehicles having dual-tandem wheels. The power so conveyed may be used to operate wheel lights, tire pressure alarm systems, brake drum heat sensors, etc.

A number of systems are known in the prior art for lighting the wheels of motor vehicles to enhance their appearance and to render the vehicle more visible to other drivers when operated at night.

Exemplary of these prior art systems is that describe Styer U.S. Pat. No. 1,643,593 et al., in which a wheel mounted light rotates with the wheel and in which a ring and brush arrangements conveys power from the vehicle electrical system to the rotating light.

Bradway U.S. Pat. No. 3,113,727 directed to a wheel lighting device in which lights are electrically connected to the automobile power source by means of wires connected to a complicated lug bolt and spring tensioned brush system.

Hinricks U.S. Pat. No. 4,381,537 is directed to a wheel lighting device that is not attached directly to the wheel and therefore does not require the transfer of electrical power from the vehicle power source to the wheel.

Scott U.S. Pat. No. 4,881,153 is directed to a wheel lighting system that involves a disk assembly bolted to the vehicle by way of the existing wheel lug bolts.

None of the wheel lighting systems disclosed in these prior art references is applicable to heavy trucks and recreational vehicles, for example, that have dual-tandem wheels.

It is therefore a principal object of the present invention to provide a self-suspended electrical brush contact system for conveying electrical power to the wheels of vehicles having dual-tandem wheels.

This and other objects are accomplished in accordance with the illustrated preferred embodiments of the present invention by providing a brush ring positioned at the juncture between the inner and outer rims of the front pair of dual-tandem vehicle wheels and the inner and outer rims of the rear pair of dual-tandem vehicle wheels. Each of the brush rings is electrically insulated from the rims with which it is associated by an insulating extrusion. Each insulating extrusion and brush ring is fitted for rotation in concert with the wheels of the vehicle. Front and rear support members having idler pulleys thereon are suspended between the inner and outer pair of dual wheels and between the front and rear pair of tandem wheels. A belt, coupled between each one of the brush rings and an adjacent one of the idler pulleys, is driven by the brush ring. A central turnbuckle is employed to adjustably couple the front and rear support members, thereby providing adjustment for the tension of the belts driven by the brush rings. Electrical power from the vehicle is connected to the front and rear support members and thence to the brush rings by way of brushes that are connected to the front and rear support members and that are also in electrical contact with the brush rings. The electrical power conveyed to the rotating brush rings may then be connected to power wheel lighting systems, tire pressure sensors, sound sensors, etc. In accordance with an alternative embodiment of the present invention, a single belt is coupled between the two brush rings and tensioned by means of a turnbuckle/pulley assembly connected to a support member suspended thereby.

DETAILED DESCRIPTION OF THE INVENTION

Figure 1:
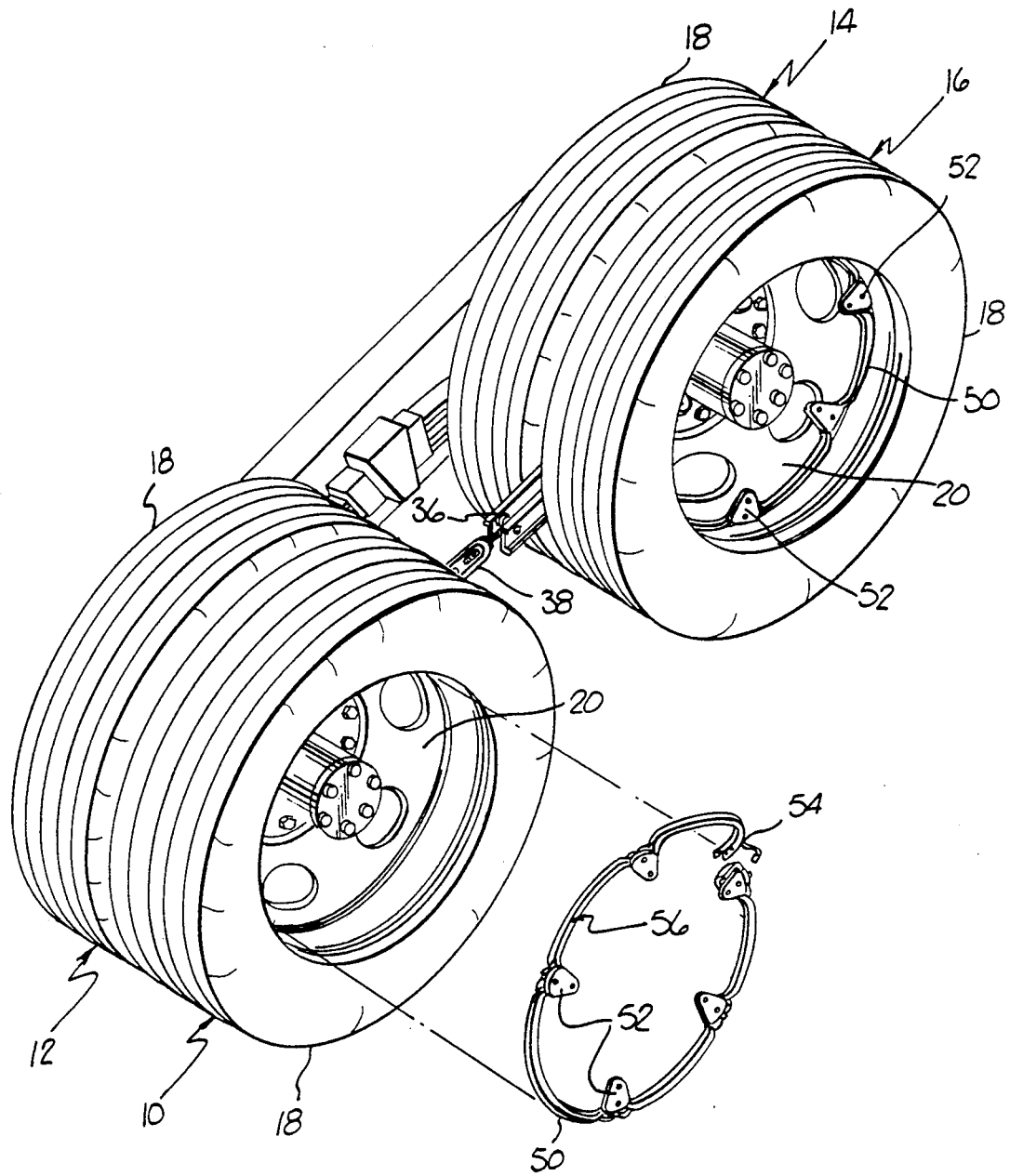
FIG. 1 is a pictorial diagram illustrating a conventional set of dual-tandem wheels as may be found on a heavy truck or other vehicle, a portion of the self-suspended electrical brush contact system of the present invention, and light rings that may be mounted in the outer wheel rims to illuminate the outer wheels from the electrical system of the vehicle.

Referring now to FIG. 1, there are shown front and rear pairs of dual-tandem wheels 10, 12, 14, 16 as may be found on any of a number of heavy motor vehicles such as diesel trucks, recreational vehicles, buses, etc. Each of dual-tandem wheels 10, 12, 14, 16 comprises a tire 18 mounted on a rim 20. Two rim/tire combinations, conventionally mounted on a hub using a set of lug bolts 24, make up each of the front and rear pairs of dual-tandem wheels.

Figure 2:
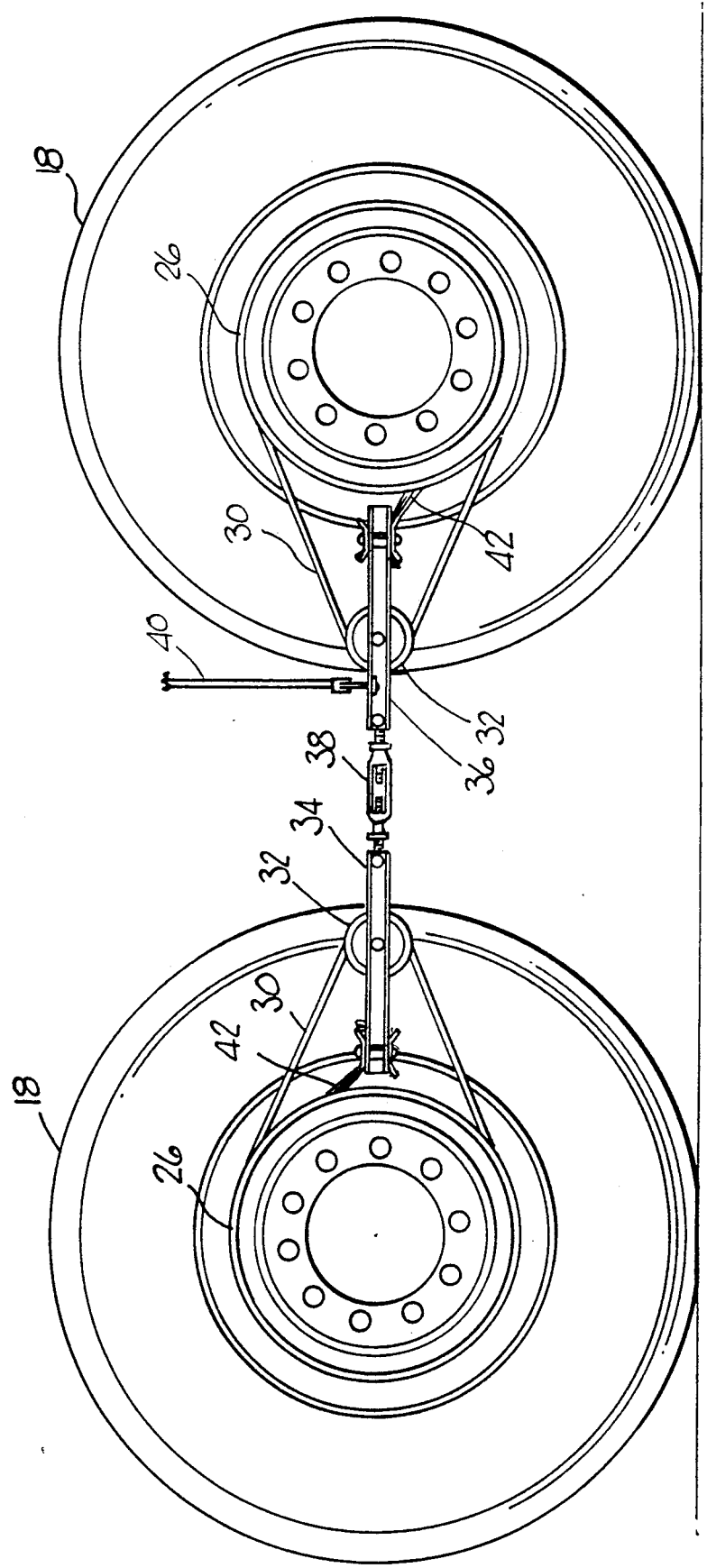
FIG. 2 is a side view of the inner pair of dual-tandem wheels illustrated in FIG. 1 in which the details of the self-suspended electrical brush contact system of the present invention are shown.
Figure 3:
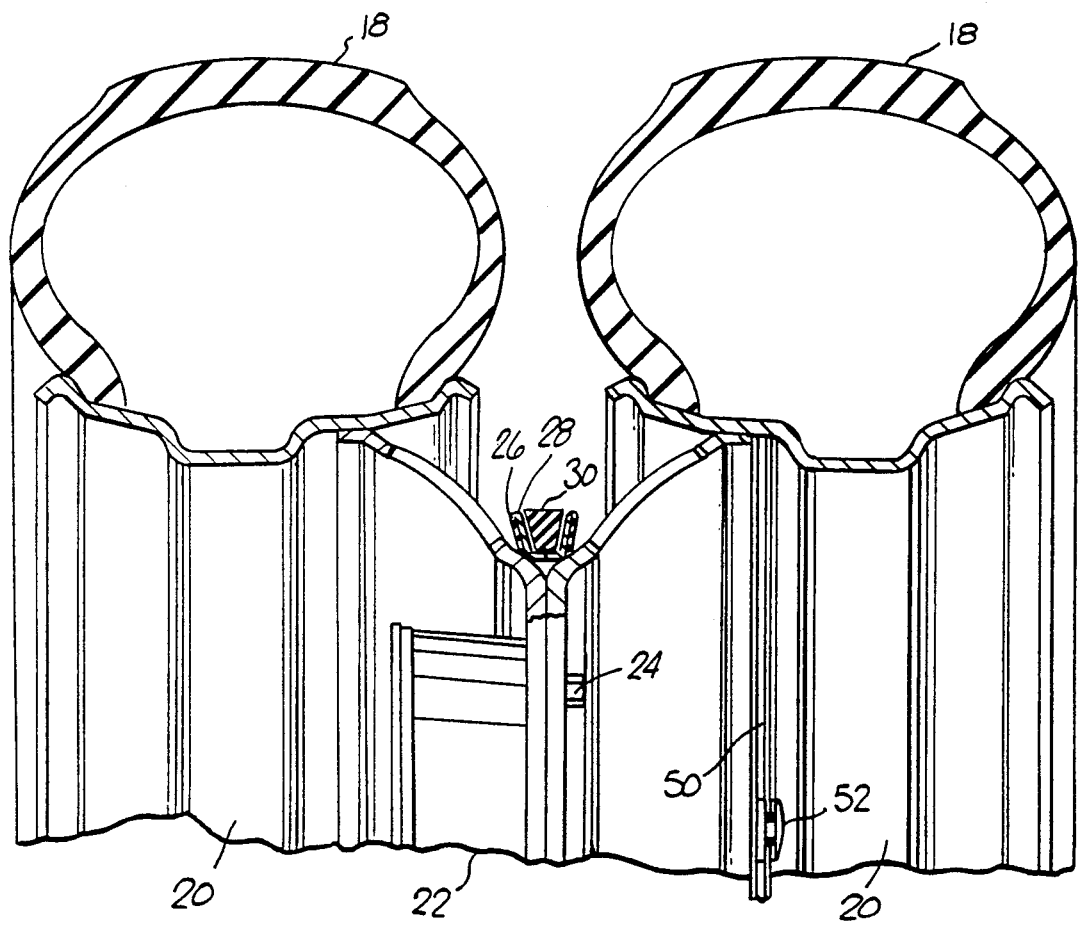
FIG. 3 is s a cross-sectional view of an inner and outer pair of the tandem wheels of FIG. 1.

Referring further to FIGS. 2 and 3, each of the front and rear pairs of inner and outer dual wheel rims 20 is mounted to a wheel hub 22 by means of a plurality of lug nuts 24. A circular extrusion 26 having a U-shaped cross section is captured at the juncture between each pair of inner and outer rims 20. Alternatively, each of extrusions 26 may have a flat cross section. Each of the circular extrusions 26 is sized and fitted such that it rotates, without slippage, in concert with its respective pair of inner and outer wheel rims 20. A circular brush ring 28, that may either be flat or shaped to mate with extrusion 26, fits inside each of the extrusions 26 and is also sized and fitted to rotate in concert with its associated pair of inner and outer wheel rims 20 and its associated extrusion 26. Each of brush rings 28 may be riveted, glued or otherwise fastened to its associated extrusion 26 to prevent slippage therebetween. Each of the extrusions 26 serves to electrically insulate its associated brush ring 28 from its associated inner and outer wheel rims 20. Each of the brush rings 28 drives a belt 30 that is coupled to an idler pulley 32 mounted for rotation on front and rear support members 34, 36. Support members 34, 36 may be shaped as channels or they may be formed in any other convenient shape. Support members 34, 36 are suspended between the front and rear sets of dual wheels by a respective one of the belts 30 and are centrally connected by a turnbuckle 38 that is employed to adjust the tension of the belts 30. A power lead 40, connected between a source of electrical power on the vehicle and one or both of the support members 34, 36, serves to convey electrical power to the support members. Electrical power is, in turn, conveyed to each of the brush rings 28, as they rotate in concert with the vehicle wheels 18, by a pair of brushes 42 that are connected to support members 34, 36 and positioned to be in contact with the brush rings 28 as they rotate. Brushes 42 may be fabricated of any of a number of wire rope or other electrically conductive materials. Support members 34, 36 may be constructed of an electrically conductive material or they may include a separate conductor for conveying electrical power from power lead 40 to each of the brushes 42.

Once electrical power has been conveyed to each of the rotating tandem pairs of dual inner and outer wheels of the vehicle, any of a number of wheel mounted devices may be electrically powered. For example, a light ring 50, as illustrated in FIGS. 1 and 3, may be employed to illuminate each of the outer wheels of the tandem front and rear pairs of wheels. Light ring 50 may include a number of individual lights 52 positioned around the periphery thereof. Light ring 50 may comprise a circular U-shaped channel that is positioned in a recess of each of the wheel rims 20. One or more couplers 54 may be provided on light ring 50 to connect arcuate sections thereof together. A pointed stud 56 may be positioned on light ring 50 to provide an electrical grounding contact to the outer one of wheel rims 20. The lights 52 of each of the light rings 50 are simply wired to the associated one of brush rings 28 to obtain electrical power for their operation. Other wheel mounted devices, such as tire pressure sensors, sound sensors, brake drum heat sensors, and the like, may also obtain electrical power from the rotating brush rings 28 during operation of the vehicle.

Figure 4:
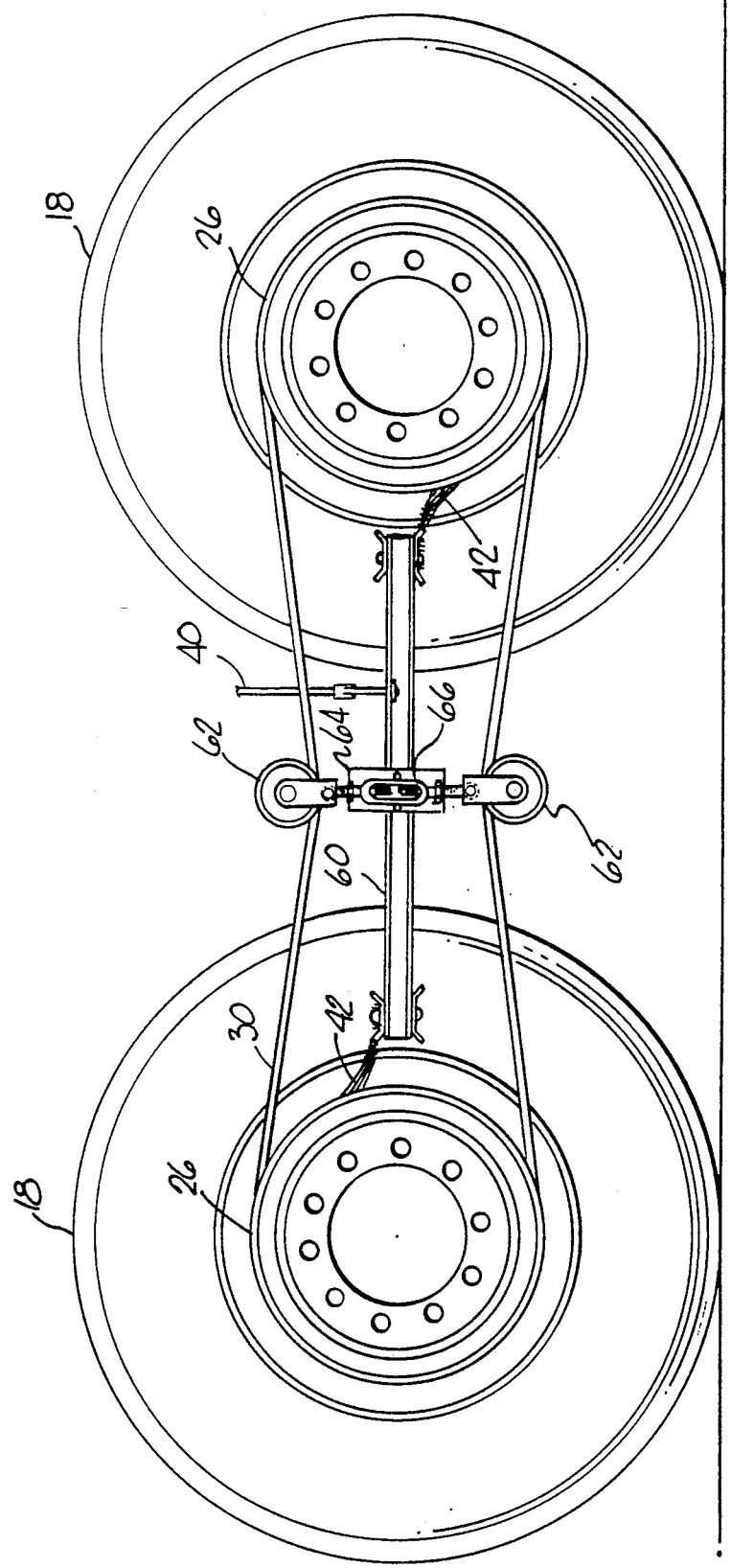
FIG. 4 is a side view of the inner pair of dual-tandem wheels illustrated in FIG. 1 in which the details of an alternative embodiment of the self-suspended electrical brush contact system of the present invention are shown.

Referring now to FIG. 4, there is shown an alternative embodiment of the present invention in which a single belt 70 is employed to suspend a single support member 60, at each end of which brushes 42 are connected and positioned for contacting brush rings 28. A turnbuckle 66 is mounted to a plate 64 that is in turn mounted to support member 60. A pair of idler pulleys 62, over which belt 70 passes, are connected to turnbuckle 66 such that adjustments of turnbuckle 66 result in altering the tension of belt 30. Otherwise, operation of the embodiment of the invention illustrated in FIG. 4 is the same as described above in connection with the embodiment illustrated in FIGS. 1-3.

I claim:

1. An electrical brush contact apparatus for conveying electrical power from a vehicle power source to the wheels of vehicles having dual-tandem pairs of wheels, the apparatus comprising:

a first electrically conductive, circular brush ring fitted at a juncture between inner and outer rims of a front pair of dual-tandem wheels;

a first electrically insulating, circular member fitted between said first electrically conductive, circular brush ring and said inner and outer rims of said front pair of dual-tandem wheels, said first electrically conductive, circular brush ring and said first electrically insulating, circular member being coupled for rotation in concert with said front pair of dual-tandem wheels;

a second electrically conductive, circular brush ring fitted at a juncture between inner and outer rims of a rear pair of dual-tandem wheels;

a second electrically insulating, circular member fitted between said second electrically conductive, circular brush ring and said inner and outer rims of said rear pair of dual-tandem wheels, said second electrically conductive, circular brush ring and said second electrically insulating, circular member being coupled for rotation in concert with said rear pair of dual-tandem wheels;

front and rear support members suspended between said front and rear pairs of dual-tandem wheels in alignment with said first and second electrically conductive, circular brush rings and said first and second electrically insulating, circular members, said front support member including front brush means electrically contacting said first electrically conductive, circular brush ring, and said rear support member including rear brush means electrically contacting said second electrically conductive, circular brush ring, said front and rear support members each including an idler pulley;

a front belt coupled between said first electrically conductive, circular brush ring and said idler pulley of said front support member, said front belt being driven by said first electrically conductive, circular brush ring;

a rear belt coupled between said second electrically conductive, circular brush ring and said idler pulley of said rear support member, said rear belt being driven by said second electrically conductive, circular brush ring;

adjustable means connecting said front and rear support members for tensioning said front and rear belts; and power conductor means for conveying electrical power from said vehicle power source to said front and rear brush means.

2. An electrical brush contact apparatus as in claim 1 further comprising circular light ring means having a plurality of light elements positioned around the periphery thereof and electrically connected to an associated one of said first and second electrically conductive, circular brush rings such that electrical power is conveyed to said plurality of light elements, said light ring means being adapted for mounting on a selected one or more of said outer rims of said front and rear pairs of dual-tandem wheels.

3. An electrical brush contact apparatus for conveying electrical power from a vehicle power source to the wheels of vehicles having dual-tandem pairs of wheels, the apparatus comprising:

a first electrically conductive, circular brush ring fitted at a juncture between inner and outer rims of a front pair of dual-tandem wheels;

a first electrically insulating, circular member fitted between said first electrically conductive, circular brush ring and said inner and outer rims of said front pair of dual-tandem wheels, said first electrically conductive, circular brush ring and said first electrically insulating, circular member being coupled for rotation in concert with said front pair of dual-tandem wheels;

a second electrically conductive, circular brush ring fitted at a juncture between inner and outer rims of a rear pair of dual-tandem wheels;

a second electrically insulating, circular member fitted between said second electrically conductive, circular brush ring and said inner and outer rims of said rear pair of dual-tandem wheels, said second electrically conductive, circular brush ring and said second electrically insulating, circular member being coupled for rotation in concert with said rear pair of dual-tandem wheels;

a central support member suspended between said front and rear pairs of dual-tandem wheels in alignment with said first and second electrically conductive, circular brush rings and said first and second electrically insulating, circular members, said central support member including front brush means electrically contacting said first electrically conductive, circular brush ring, and rear brush means electrically contacting said second electrically conductive, circular brush ring, said front and rear support members each including an idler pulley;

a pair of idler pulleys adjustably spaced from said central support member;

a belt coupled between said first and second electrically conductive, circular brush rings and between said idler pulleys, said belt being driven by said first and second electrically conductive, circular brush rings and being adjustably tensioned by said pair of idler pulleys; and power conductor means for conveying electrical power from said vehicle power source to said front and rear brush means.

4. An electrical brush contact apparatus as in claim 3 further comprising circular light ring means having a plurality of light elements positioned around the periphery thereof and electrically connected to an associated one of said first and second electrically conductive, circular brush rings such that electrical power is conveyed to said plurality of light elements, said light ring means being adapted for mounting on a selected one or more of said outer rims of said front and rear pairs of dual-tandem wheels.

* * * * *